May 28, 1968     F. A. AXELSSON     3,385,671
FOAM INJECTION HEAD

Filed March 9, 1965     2 Sheets-Sheet 1

INVENTOR.
FOLKE A. AXELSSON
BY
ATTORNEYS

May 28, 1968 F. A. AXELSSON 3,385,671

FOAM INJECTION HEAD

Filed March 9, 1965 2 Sheets-Sheet 2

INVENTOR.
FOLKE A. AXELSSON
BY
ATTORNEYS

United States Patent Office 3,385,671
Patented May 28, 1968

3,385,671
FOAM INJECTION HEAD
Folke A. Axelsson, Grand Haven, Mich., assignor to Airspace, Inc., Fruitport, Mich., a corporation of Michigan
Filed Mar. 9, 1965, Ser. No. 438,295
3 Claims. (Cl. 23—252)

This invention relates to equipment for mixing reactant plastic materials, and more particularly relates to a mixing and ejection unit for chemically reacting foamable resinous reagents.

The formation of structural laminates or of other articles with a foam plastic core, e.g. of polyurethane, or of other articles of injected foaming plastics usually necessitates a mixing head to combine the ingredients in the required reactive proportions just prior to injection. These mixed ingredients are then injected through an outlet in the head into the mold or form. Mixing heads presently available present some considerable problems in their use. This is due to the fact that the reacting reagents are difficult to mix and handle. More specifically, three significant problems arise to bother the manufacturer of the foamed articles.

The first problem occurs with the usual absence of thorough mixing of the catalyst, activator and resin base. This causes some portions of the mixture to be overreacted and/or over-foamed, while others are under-reacted and/or under-foamed. A unique mixer to achieve thorough mixing and overcome this problem is described herein, and is described and claimed in copending application entitled Foam Mixing Head Apparatus, filed Mar. 9, 1965, Ser. No. 438,338, assigned to the assignee herein.

The second problem commonly encountered is the tendency for the tiny catalyst passages and ports, and the tiny blowing agent passages and ports to the mixing chamber, to plug with the pressurized foaming materials in the mixing chamber. These ports and passages are necessarily very tiny to achieve accurate regulation of the extremely small amounts of reagents injected. For example, the amount of catalyst is usually only about 0.6% and the amount of blowing agent, e.g. Freon, is also small since it is injected in the form of compressed liquid, which warms and expands.

The resin and activator outlets, on the other hand, are relatively large due to the relatively large amount necessary for the mixture. These can, therefore, be readily unplugged with reciprocating plungers after each batch. This mechanism cannot be used, however, for the tiny catalyst and blowing agent ports and passages since they are so small. Consequently, present units require frequent periodic disassembly of the mixer head to unplug these tiny ports and passages. This disrupts an entire production line, causing considerable loss in time and money over a period of time.

The third problem also occurs with the reacting foam ingredients in the head. The pressure of the exothermic reaction, and the subsequent injection pressure forces small amounts of the foaming mixture up along the surface of the rotational mixing shaft in the head and into its bearings where it hardens. Efforts to counteract this continuous creeping and hardening of foam along the shaft have resulted in a complex series of annular seals along the shaft. However, experience during production shows that even this complex assembly is largely ineffective to prevent this penetration of the high pressure foam into the working components of the mechanism.

Presently, the mixing head must, therefore, be disassembled about every two hours, or i.e. every few hundred "shots" to unplug the ports and try to dig the foam out of the bearings, sufficiently to allow the unit to continue operating.

It is, therefore, an object of this invention to provide a novel mixing head for chemically reacting reagents under pressure, and especially of foamable reacting plastic materials, capable of operating many hours, and even rays, without constant disassembly for port and bearing cleaning. The unit eliminates the production of "bottleneck" so well-known today, and yet does so in a relatively inexpensive manner.

It is another object of this invention to provide the novel mixing unit for plastics and particularly foamable plastics, which has been found under extensive testing to completely eliminate the constant plugging problem for the tiny catalyst and blowing agent ports and passageways.

Still another object of this invention is to provide a novel mixing unit or mixing head for mixing resinous foaming reagents, capable of maintaining the shaft and bearings completely free of the foaming reagents, even though the pressure in the chamber is often very high.

These and several other objects of this invention will become apparent upon studying the following specification in conjunction with the drawings in which.

Figure 1:
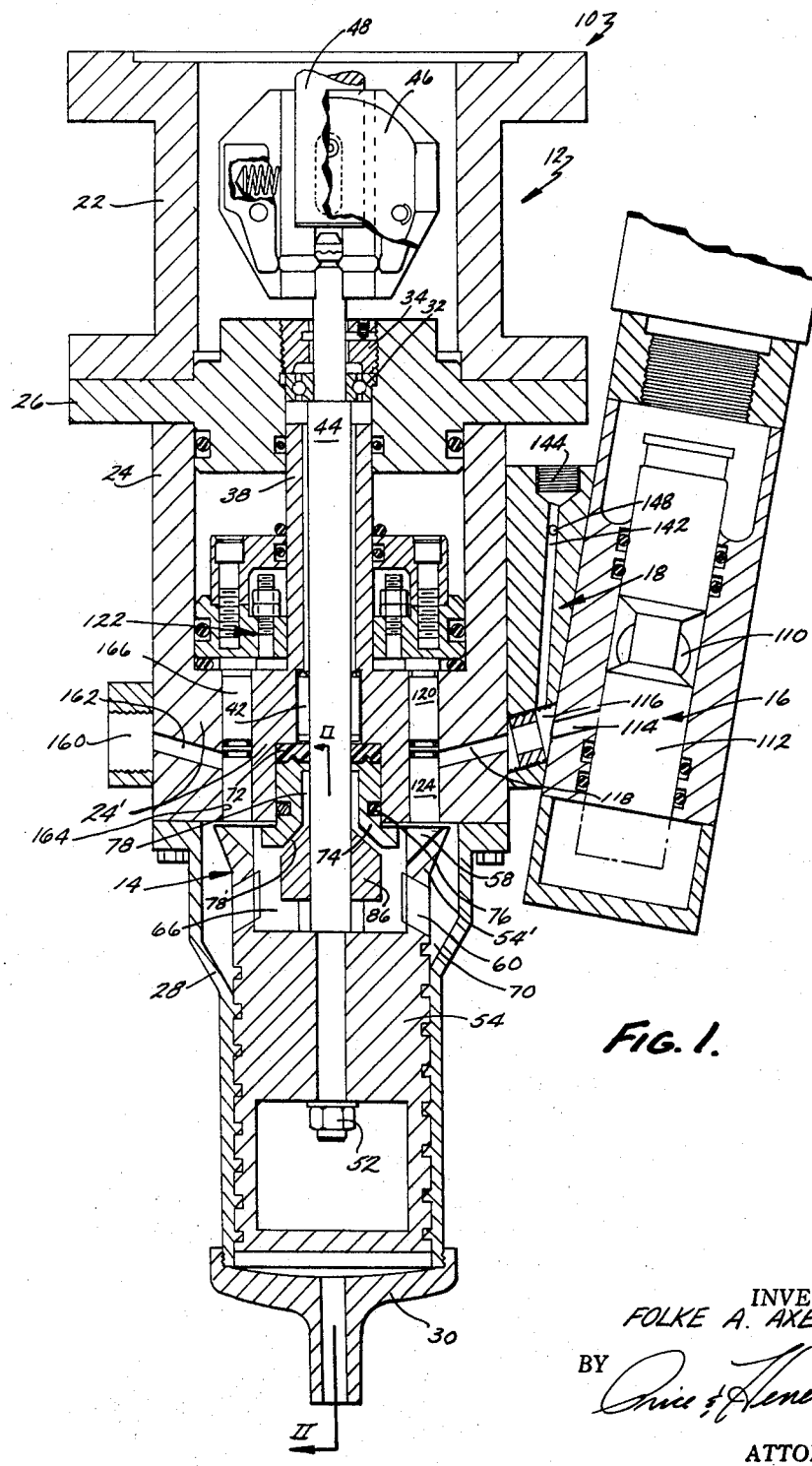
FIG. 1 is a side elevational, sectional view of the novel mixing vessel or head.

Referring now specifically to the drawings, the complete assembly 10 (FIG. 1) basically includes a housing subassembly 12, a mixing mechanism subassembly 14, a resin injector subassembly 16, and a coupling adapter plate fitting 18.

The enclosing housing 12 may be of any suitable construction, preferably of the interconnected elements shown. It includes shell elements 22 and 24 securing an annular bearing support 26 therebetween, and a mixing chamber shell 28 to which an outlet nozzle 30 is attached. Support 26 secures a shaft bearing 32 and its retainer 34. The central opening in the support also receives the upper end of an annular, elongated sleeve 38 projecting upwardly from the base 24' of shell portion 24. This base also includes a central opening receiving a needle bearing assembly 42. Rotational shaft 44 is retained by bearings 32 and 42. The upper end of shaft 44 is attached to a gripping drive clutch assembly 46 secured to a drive shaft 48.

Figure 4:
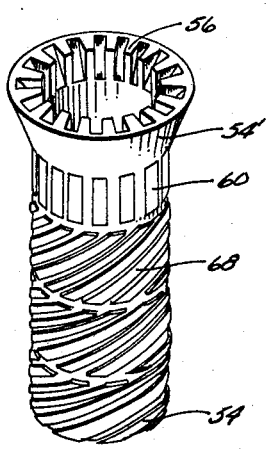
FIG. 4 is a perspective view of the mixing element for the head.
Figure 5:
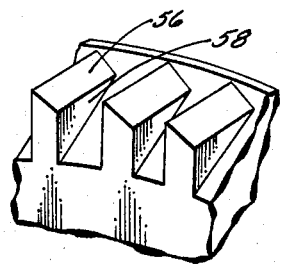
FIG. 5 is an enlarged, fragmentary, perspective view of a portion of the top of the mixer element.

Attached to the lower end of shaft 44 by a nut and thread securement 52 is a generally cylindrical, elongated mixing element 54. This mixing element includes an upwardly flared end 54' formed of a plurality of adjacent shearing teeth 56 (FIG. 5) and intermediate recesses 58. It also includes a plurality of lower outlet openings 60 (FIG. 4) extending between the upper central cavity 66 in the mixing element, and its outer periphery. A plurality of helical, material-advancing ribs or threads 68 are formed as part of the cylindrical peripheral surface of the mixing element to move the mixed ingredients down through shell 28 to nozzle 30.

The mixing element fills a major part of mixing chamber 70 defined by shell portion 28. In the base 24' adjacent the mixing chamber, and coaxial with shaft 44, is a recess or cavity 72. It is cylindrical in configuration and receives a special annular collar element 74. The collar fits around shaft 44. It has a sealing ring 76 fitted against the housing.

Figure 2:
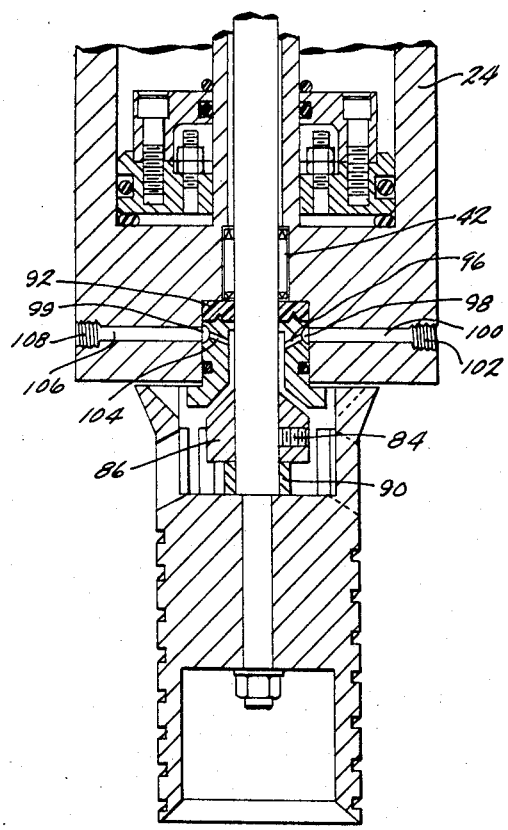
FIG. 2 is a fragmentary, sectional, elevational view of a portion of the mixing unit in FIG. 1, taken on the vertical plane II—II normal to the vertical section plane in FIG. 1.

The inner diameter of collar 74 is machined to a slightly larger dimension than the adjacent shaft diameter to form a narrow, restricted, annular passage means 78 around the shaft along a portion thereof. The lower end 78' of the passage means diverges in frusto-conical configuration into the mixing chamber, and more specifically, into the cavity portion 66 on the upper end of the mixer element. Attached to shaft 44 by a set screw 84 (FIG. 2) adjacent collar 74 is a second collar 86. It has a tapered frusto-conical upper surface corresponding to the frusto-conical lower outlet portion of the annular passage in collar 74 to fit closely thereto. Consequently, adjustment of collar 86 toward and away from collar 74 regulates the size of the flared outlet portion 78' of the annular passage means 78 to regulate flow of material therethrough. The mixing element 54 is held with respect to collar 86 by an annular spacer 90.

Collar 74 is sealed at its upper end by an annular seal 92 adjacent needle bearings 42. The collar includes a pair of passages, with the first passage 96 extending from inner annular passage means 78 to a peripheral inlet port 98. This communicates with a third passage 100 which extends through the wall of base 24' of housing portion 24. A suitable threaded connection 102 is provided for the blowing agent, such as refrigeration, compressed Freon.

A second passage 104 similar to passage 96 extends through collar 74 to a second inlet port 99, which communicates with a third passage 106. This passage extends through the housing base from a threaded connection 108, where a supply line for a releasing solvent is attached. This releasing solvent releases the mixed reagents from the wall surfaces for discharge. A typical solvent for polyurethanes is methylene chloride for example.

Injection of the blowing agent through these cited passages causes it to flow down a portion of the shaft through the annular passage means and into the mixing chamber in controlled volumes. Likewise, injection of the releasing solvent at the end of the mixing time for the batch causes it to flow down the shaft to clean out the components and release the foamable reagents. These are used in a manner specifically described hereinafter.

The resin inlet structure 16 is of generally conventional construction. It includes an inlet passage 110 for the resin base material. A reciprocable plunger 112 having a central annular recess portion adjacent inlet port 110 enables the regulation of the resin inlet to the mixing chamber. When it is shifted to the position illustrated in FIG. 1, no resin is injected. When it is shifted to a lower position as illustrated by the phantom lines in FIG. 1, resin is injected. Port 110 can communicate through its annular portion to passage 114 and passage 116, thence to passage 118 in the housing.

Figure 3:
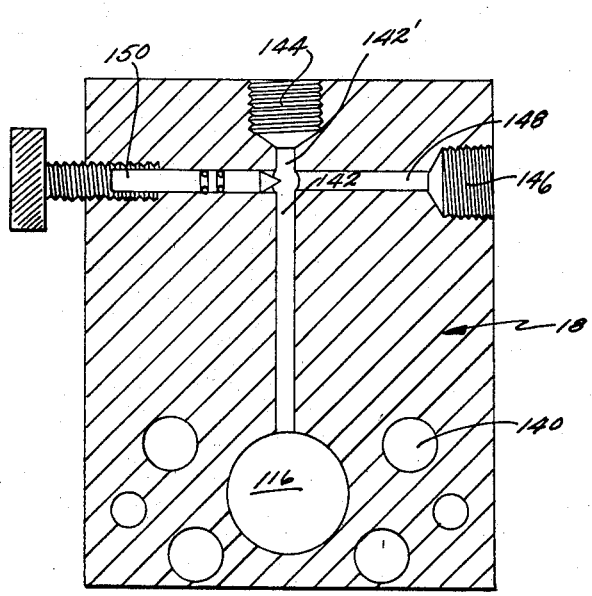
FIG. 3 is a sectional, elevational, enlarged view of the adapter coupling fitting between the resin injection plunger unit and the main housing of the head.

Under normal conditions during injection of the resin, plunger 120 is in a raised position with elevation of the reciprocable piston assembly 122, to allow flow from passage 118 down through passage 124 into the mixing chamber through the shearing mechanism formed by teeth 56 and cavities 58. Positioned between housing portion 24 and this cylinder assembly 16 is an adapter fitting 18. As seen more specifically in FIG. 3, this adapter coupling assembly includes bolt receiving openings 140 for attachment, and passage 142 leading to passage 116. This passage 142 in turn has two inlets, one from the threaded connection 144 through passage 142' for solvent entry, and one from the threaded connection 146 through passage 148 for injection of the catalyst for the reaction. A needle valve assembly in the adapter 150 controls flow through passage 148. The catalyst and/or the solvent, therefore, flow through passage 142 to passage 116, to passage 118, to passage 124, and into the mixing chamber. It will be noted, therefore, that the catalyst enters through the resin passage a considerable distance removed from the mixing chamber. The unplugging plunger element 120 is between the mixing chamber and the catalyst passage and its outlet port into the resin passage. This has an important result as will be described hereinafter.

On the opposite side of the housing is a second inlet connection 160 for the reaction actuator chemical reagent. This associates or communicates with passage 162, and through passage 164 having a similar reciprocable plunger 166 therein, into the mixing chamber.

OPERATION

In studying the described operation of the novel apparatus, it will be understood that this novel unit was developed for and is intended mainly for foamable plastic materials to form injectable substances such as reacting polyurethane foam that will blow after injection. Therefore, it will be described with respect to these particular materials and type of substance for purposes of convenience. However, it is conceivable that it could be employed with other similar materials or applications that present similar problems of mixing and handling.

To prepare a material such as a polyurethane resin to be injected into a mold, a form, or between two panels of a sandwich laminate, for example, the resin must be expanded by a blowing agent. This agent can be formed as part of the chemical reaction, e.g. the formation of carbon dioxide by the addition of water to the reacting polyisocyanate materials, or by injecting a separate blowing agent into the mixture. This external blowing agent, often a Freon gas producing material, is added to the mixing ingredients as a compressed refrigerated liquid. The basic ingredients, therefore, include (1) the resin base material, for example, an isocyanate such as polymethylene, polyphenyl isocyanate or 2,4-tolylene diisocyanate or other like useable materials; (2) an activator reagent such as epichlorohydrin or a polyol such as a polyester or polyether type containing hydroxol groups, including typical substances such as adipic acid or polypropylene glycol; (3) a blowing agent such as the Freon types mentioned above; and (4) a catalyst such as a tertiary amine or its equivalent, all of which are well-known and regularly used.

In order to obtain a reaction, the isocyanate, the hydroxol activator, and the catalyst must be mixed. To obtain foam expansion of the mixed reagents, the refrigerated blowing agent must be mixed right in with the others by introducing it in its liquid form so that it will be heated by the exothermic chemical reaction. During reaction of the reagents, the exothermic nature of the reaction also causes pressure to occur as well as heat.

In operation, the isocyanate or resin base is injected from port 110 through passages 114, 116, 118, 124, into the rapidly rotating shearing cavities 58 and into the mixing chamber, on a continuous basis. The catalyst is simultaneously injected through passage 148, down passage 142 to passage 116, to enter with the resin base. It is not injected directly into the mixing chamber, and is not in direct communication therewith. Also, at this same time, the actuator material such as the hydroxol containing reagent is injected through passageway 162 and passageway 164 into the shearing cavities 58. Since shaft 44 and mixing element 54 are rotated at high speeds, the shearing teeth alternately slice off very thin layers of tiny amounts of resin and then mix them continuously and thoroughly as they pass through the passageways.

It will be noted that passageways 124 and 164 are aligned directly with the shearing chambers and teeth of the impeller mixer, thereby requiring the materials to pass through this special shearing apparatus. The mixed resin is then fed down by helical screws 68 out nozzle 30.

When the injection is complete to fill the particular mold (not shown) the supply of ingredients is stopped, and piston 122 is shifted, as by air pressure, to lower plungers 120 and 166. This forces any residual resin and actuator out passageways 124 and 164, and to close off this passage, preventing flow of the materials from the mixing chamber back through the passageways under the tremendous pressures created. This, of course, protects the tiny passages for the blowing agent and the solvent.

Continuously during the injection of the resin and the actuator, and during the mixing and discharge of the mixed foaming resin out nozzle 30, the blowing agent is injected under pressure through passage 100 (FIG. 2), passage 96 and annular passage means 78, down the shaft surface and into the chamber. The amount of blowing agent admitted constantly through this chamber is regulated so that the total amount is exactly that required by the batch of resin mixed. By injecting the blowing agent down around the shaft in this fashion, it provides a constant high velocity washing or wiping action around the entire periphery of the shaft toward the mixing chamber, thereby preventing the reagents from flowing backwardly through the narrow annular passage means against the force of the high pressure blowing agent, and up into the bearings. It has been found that this is an extremely effective method of achieving clean bearings without penetration of the high pressure foaming materials to jam the mechanism. In fact, under actual operating conditions at least two to three thousand mixing and injection shots can be achieved without requiring cleaning of the mechanism.

This flowing cleaning action is supplemented by the intermittent injection under pressure of the releasing and cleaning solvent through passage 106 and down the annular passage means at the end of each mixing operation. This solvent, which causes the foaming material to release from the surfaces, readily removes any small bit of foam which may have started up along the shaft, as well as loosening all other foam in the mixing chamber to be discharged under an air pressure blast subsequently injected. As stated previously, some of the solvent is also injected through the adapter plate to clean out the resin passage. The total amount of the two is of course carefully regulated.

Although the catalyst injection passage and port is shown to communicate with the resin injection passage, it could conceivably be associated either partially or totally with the actuator passages, provided it does not come into direct communication with the mixing chamber as taught above. Therefore, this variation is within the concept of this inventive construction.

The mechanism shown and described has proven to effectively eliminate the penetration of the reacting, high pressure foaming material into the operating mechanism, and specifically along the shaft into its bearings. It also eliminates plugging of the tiny catalyst and blowing agent ports.

Conceivably certain detailed portions of the apparatus could be modified to suit a particular situation, type of resin, or injection sequence, without departing from the concepts set forth herein. Therefore, this invention is to be limited only by the scope of the appended claims, and the reasonable equivalents thereto.

I claim:

1. A mixing and ejection head for mixing and ejecting reagents of foamable reacting plastics, comprising: a housing including a mixing chamber; a shaft rotatably mounted in said housing; bearing means around said shaft; a rotatable mixer in said chamber and attached to said shaft to be rotated therewith for mixing reagents introduced into said chamber; injection passages in said housing into said chamber for introducing resin, catalyst, and activator reagents to be reacted; a recess in said housing adjacent said chamber and around a portion of said shaft; said recess being between said chamber and said bearing means; collar means in said recess forming a restricted annular passage means around and along said shaft into said chamber; blowing agent passage means in said housing for entry of a blowing agent; said passage terminating in said annular passage means to cause blowing agent flow along the periphery of said shaft portion into said chamber to prevent reverse reagent flow of the mixed resin, catalyst, and activator from said chamber along said shaft in the opposite direction into said bearing means; a second collar adjustably attached to said shaft adjacent said first collar and having an end surface corresponding in configuration to an adjacent end surface on said first collar to define a controlled outlet from said annular passage into said chamber; and outlet port means in said housing from said chamber for the mixed reagents.

2. The head in claim 1 wherein an additional passage in said head communicates with said annular passage means for injecting releasing solvent down said shaft portion and into said chamber.

3. A mixing and ejection head for foamable reacting resin materials comprising: a housing including a mixing chamber; a shaft rotatably mounted in bearings in said housing; a rotatable mixer in said chamber and attached to said shaft to be rotated therewith; injection passages in said housing into said chamber for major ingredients to be reacted; unplugging means in said passages shiftable from a first position to a second position to push ingredients therefrom into said chamber; tiny passage and port means in said housing for injecting additional reagents in small amounts into said chamber; said port means communicating with at least one of said ingredient passages intermediate its ends, spaced from said chamber; said plunger means in said second position being between said port means and said chamber means; a recess in said housing adjacent said chamber and around a portion of said shaft; said recess being between said chamber and said bearings; collar means in said recess, forming a restricted annular passage means along said shaft into said chamber; further passage means in said housing for entry of a blowing agent; said passage terminating in said annular passage means to cause blowing agent flow along said shaft portion into said chamber to prevent reagent flow from said chamber along said shaft into said bearings; a second collar attached to said shaft adjacent said first collar to define a controlled outlet from said annular passage into said chamber; and an additional passage in said head communicating with said annular passage means for periodically injecting releasing solvent down said shaft portion and into said chamber.

References Cited

UNITED STATES PATENTS

| 3,164,374 | 1/1965 | Ralph | 259—8 X |
| 3,207,486 | 9/1965 | Rosenthal | 259—8 |
| 3,220,801 | 11/1965 | Rill et al. | 23—252 |
| 3,222,134 | 12/1965 | Peterson | 23—252 |

JAMES H. TAYMAN, JR., *Primary Examiner.*